US012298693B2

(12) United States Patent
Ishihara et al.

(10) Patent No.: US 12,298,693 B2
(45) Date of Patent: May 13, 2025

(54) HEATING DEVICE

(71) Applicant: FUJIFILM Business Innovation Corp., Tokyo (JP)

(72) Inventors: Takuma Ishihara, Kanagawa (JP); Takashi Ohashi, Kanagawa (JP); Takashi Matsubara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 926 days.

(21) Appl. No.: 17/462,093

(22) Filed: Aug. 31, 2021

(65) Prior Publication Data

US 2022/0373947 A1 Nov. 24, 2022

(30) Foreign Application Priority Data

May 21, 2021 (JP) ................................ 2021-085906

(51) Int. Cl.
*G03G 15/20* (2006.01)
*H05B 3/00* (2006.01)

(52) U.S. Cl.
CPC ..... *G03G 15/2057* (2013.01); *G03G 15/2042* (2013.01); *G03G 15/2053* (2013.01); *G03G 15/206* (2013.01); *G03G 15/2064* (2013.01); *H05B 3/0095* (2013.01)

(58) Field of Classification Search
USPC .......................................... 399/33, 328, 329
See application file for complete search history.

(56) References Cited

FOREIGN PATENT DOCUMENTS

| | | |
|---|---|---|
| JP | 10-003226 A | 1/1998 |
| JP | 10-240056 A | 9/1998 |
| JP | 11-161092 A | 6/1999 |
| JP | 3436437 B2 | 8/2003 |

OTHER PUBLICATIONS

Communication issued Sep. 3, 2024 from the Japanese Office Action in Japanese Application No. 2021-085906.

*Primary Examiner* — Quana Grainger
(74) *Attorney, Agent, or Firm* — Sughrue Mion, PLLC

(57) ABSTRACT

A heating device includes a heating roller having a resistance heat-generating layer that generates heat by passage of a current through the resistance heat-generating layer, a pressure rotating body that rotates in such a manner as to press a sheet-shaped heating target that is an object to be subjected to a heating treatment against an outer peripheral surface of the heating roller and in such a manner as to cause the heating target to pass through the outer peripheral surface of the heating roller, and an auxiliary heating unit that supplementarily heats at least an axial end region included in a heat-generating region in which heat is generated by the resistance heat-generating layer of the heating roller.

18 Claims, 9 Drawing Sheets

HEATING DEVICE

CROSS-REFERENCE TO RELATED APPLICATIONS

This application is based on and claims priority under 35 USC 119 from Japanese Patent Application No. 2021-085906 filed May 21, 2021.

BACKGROUND

(i) Technical Field

The present disclosure relates to a heating device and a heating-target using apparatus.

(ii) Related Art

Japanese Patent No. 3436437 (claim 1, FIG. 1 to FIG. 6, and so forth) describes a heating roller that is used for a fixing operation and that includes a hollow roller body and a resistance heat-generating member, which generates heat as a result of a predetermined driving signal being applied thereto, and a fixing device in which the heating roller is pressed into contact with a pressing roller. The heating roller that is used for a fixing operation heats and fixes a recording material deposited on a recording medium, which is transported by being in contact with the outer peripheral surface of the roller body, onto the recording medium as a result of the heat generated by the resistance heat-generating member being transferred to the outer peripheral surface of the roller body. In addition, Japanese Patent No. 3436437 describes that, in the heating roller, the resistance heat-generating member is formed of a heat generating sheet including a resistance heat-generating element fixed to one surface of an insulating film member and a heat-conductive element fixed to the other surface of the insulating film member so as to conduct the heat generated by the resistance heat-generating element and also describes that the heat-conductive element is in contact with the inner peripheral surface of the roller body and that the resistance heat-generating element is fixed to the inner peripheral surface of the roller body in such a manner that the resistance heat-generating element is oriented toward the center of the roller body.

Japanese Unexamined Patent Application Publication No. 10-3226 (claim 1, FIG. 1 to FIG. 4, and so forth) at least describes a heating roller that is used for a fixing operation and that includes a heat-generating member configured to generate heat as a result of a voltage being applied thereto and a current flowing therethrough and a cylindrical roller body to which the heat generated by the heat-generating member is transferred and a fixing device in which the heating roller is pressed into contact with a pressing roller. In addition, Japanese Unexamined Patent Application Publication No. 10-3226 describes that the heat-generating member is formed by bonding a heating element, which is formed by processing a sheet-shaped resistance heat-generating element into a predetermined pattern, to one side surface of an insulating film member and that the other side surface of the insulating film member is fixed to the inner peripheral surface of the roller body.

SUMMARY

Aspects of non-limiting embodiments of the present disclosure relate to providing a heating device and a heating-target using apparatus that are capable of suppressing uneven distribution of temperature in regions of a heating roller having a resistance heating layer that generates heat by passage of a current therethrough, the regions being located at the opposite ends of the heating roller in the axial direction of the heating roller, compared with the case where an auxiliary heating unit configured to supplementarily heat at least regions that are located at the opposite ends of a region in which heat is generated by the resistance heat-generating layer of the heating roller is not provided.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a heating device including a heating roller having a resistance heat-generating layer that generates heat by passage of a current through the resistance heat-generating layer, a pressure rotating body that rotates in such a manner as to press a sheet-shaped heating target that is an object to be subjected to a heating treatment against an outer peripheral surface of the heating roller and in such a manner as to cause the heating target to pass through the outer peripheral surface of the heating roller, and an auxiliary heating unit that supplementarily heats at least an axial end region included in a heat-generating region in which heat is generated by the resistance heat-generating layer of the heating roller.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the drawings.

First Exemplary Embodiment

Figure 1:
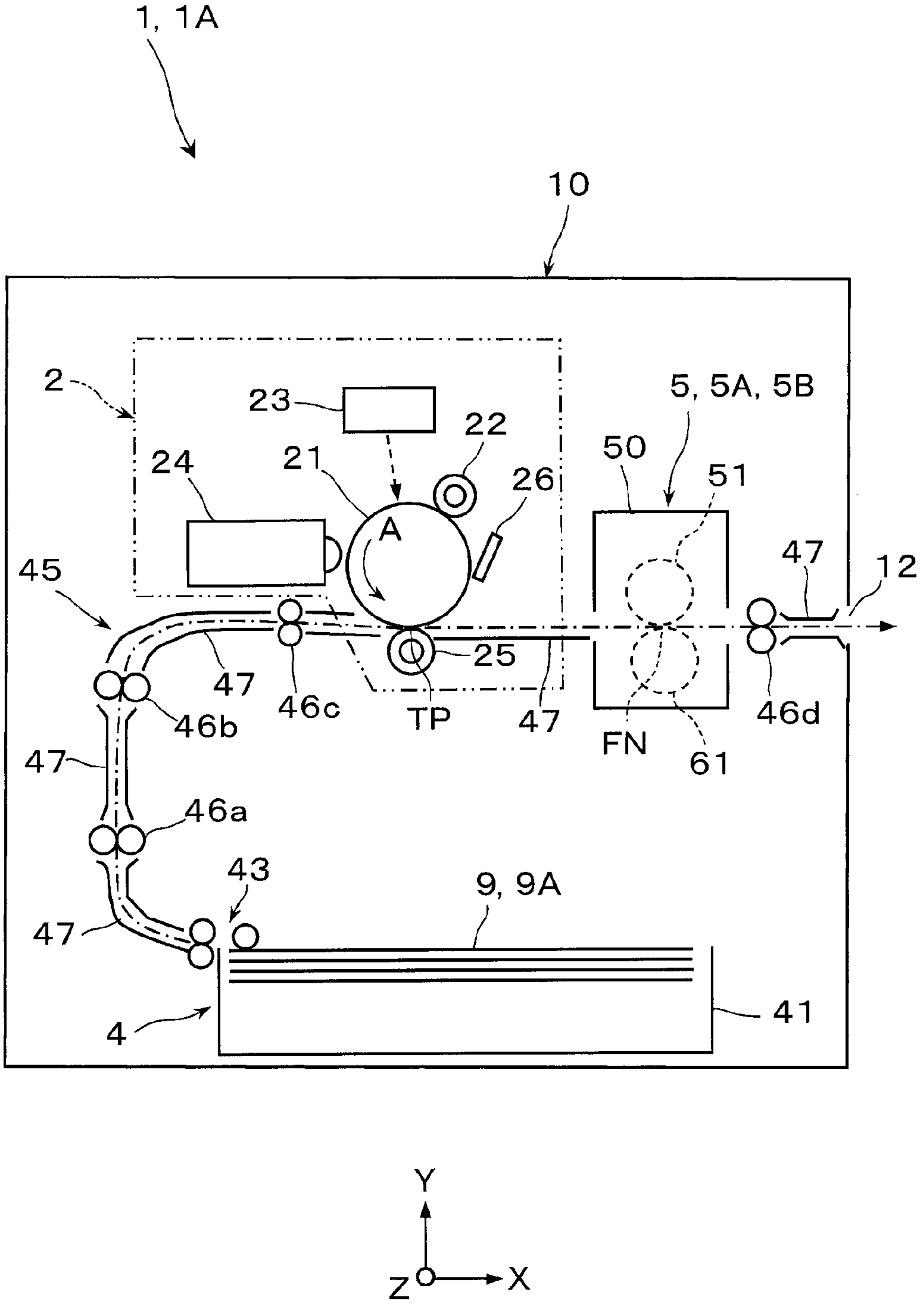
FIG. 1 is a schematic diagram of an image forming apparatus according to a first exemplary embodiment, which is an example of a heating-target using apparatus.
Figure 2:
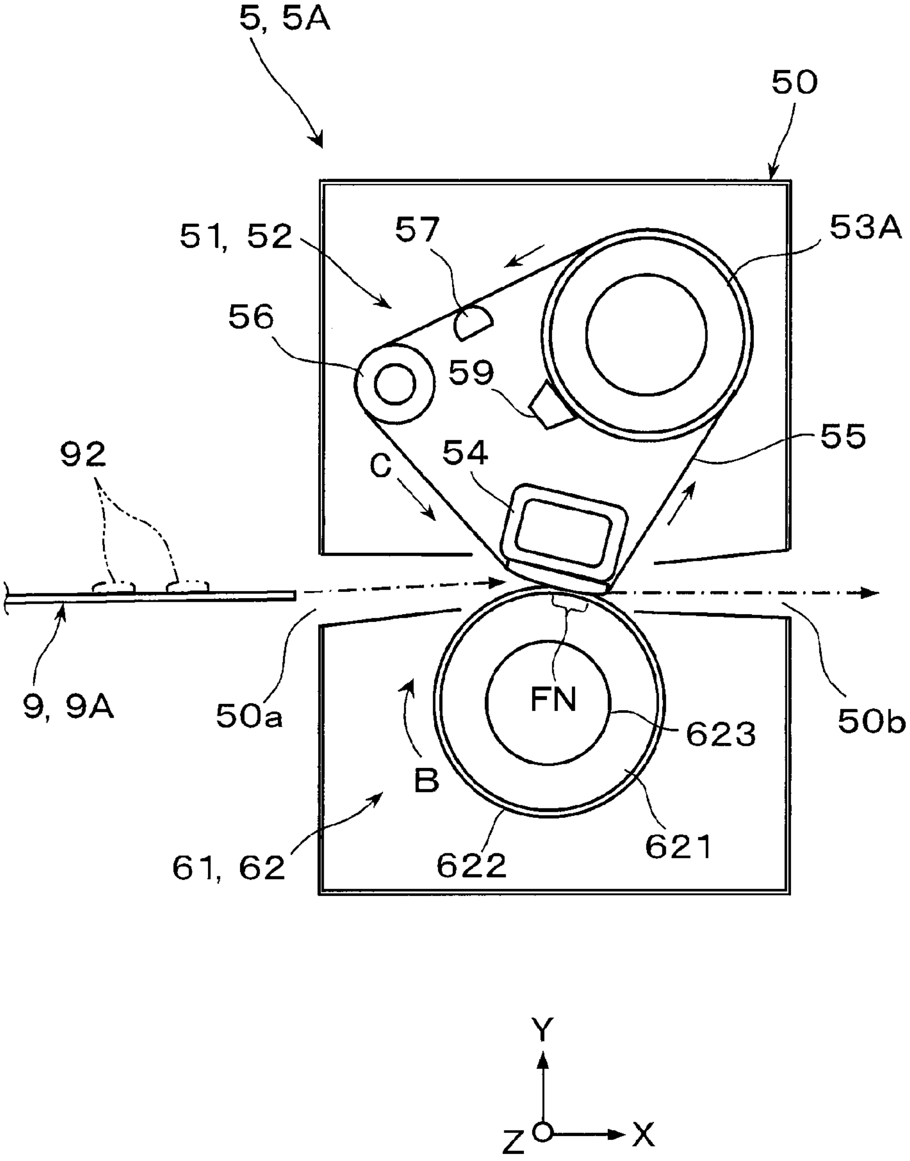
FIG. 2 is a schematic diagram of a fixing device according to the first exemplary embodiment, which is an example of a heating device.

FIG. 1 illustrates an image forming apparatus 1A according to the first exemplary embodiment, which is an example of a heating-target using apparatus 1. FIG. 2 illustrates a fixing device 5A according to the first exemplary embodiment, which is an example of a heating device 5.

The heating-target using apparatus 1 is an apparatus that uses a sheet-shaped object 9 that is to be heated (hereinafter referred to as "heating target 9"). The heating device 5 is a device that at least heats the sheet-shaped heating target 9.

In the following description, the direction indicated by arrow X, the direction indicated by arrow Y, and the direction indicated by arrow Z in the drawings respectively correspond to a width direction of the apparatus, a height direction of the apparatus, and a depth direction of the apparatus that is perpendicular to both the width direction and the height direction. In the drawings, a circle mark at the intersection of arrow X and arrow Z indicates that arrow Z corresponding to the depth direction of the apparatus points in a downward direction perpendicular to the plane in each of the drawings.

<Heating-Target Using Apparatus>

The image forming apparatus 1A, which is an example of the heating-target using apparatus 1, forms an image by heating one of recording media 9A on which an image has been formed with powder developer. Each of the recording media 9A is an example of the sheet-shaped heating target 9.

As illustrated in FIG. 1, the image forming apparatus 1A includes a housing 10 having a desired external shape, and an image forming device 2, a medium supply device 4, a medium transport device 45, a fixing device 5A, and so forth are arranged in the internal space of the housing 10. In FIG. 1, a transport path along which the recording media 9A are transported by the medium transport device 45 in the housing 10 is indicated by a one-dot chain line.

The image forming device 2 is a device that forms a toner image by using a toner, which functions as a developer, and transfers the toner image onto one of the recording media 9A. The image forming device 2 is configured as, for example, a device that employs an image forming system such as an electrophotographic system, and in the image forming device 2, units such as a charging unit 22, an exposure unit 23, a developing unit 24, a transfer unit 25, and a cleaning unit 26 are arranged around a photoconductor drum 21 that rotates in the direction indicated by arrow A.

The photoconductor drum 21 is an example of an image holding unit and is a drum-shaped photoconductor having a photosensitive layer that serves as an image forming surface and as an image holding surface. The charging unit 22 is a unit that charges the outer peripheral surface (the image forming surface) of the photoconductor drum 21 to a required surface potential. For example, the charging unit 22 includes a charging member that has, for example, a roll-like shape, and the charging member is brought into contact with the outer peripheral surface (the image forming surface) of the photoconductor drum 21 and is supplied with a charging current.

The exposure unit 23 is a unit that exposes the outer peripheral surface of the photoconductor drum 21, which has been charged, to light on the basis of image information so as to form an electrostatic latent image. The exposure unit 23 operates in response to receiving an image signal that is generated as a result of an image processing unit or the like (not illustrated) performing a required processing operation on image information input from the outside. The image information is, for example, information relating to an image to be formed such as a character, a figure, a photograph, or a pattern. The developing unit 24 is a unit that develops an electrostatic latent image formed on the outer peripheral surface of the photoconductor drum 21 into a visible monochromatic color toner image with a developer (a toner) of a corresponding predetermined color (e.g., black).

The transfer unit 25 is a unit that electrostatically transfers a toner image formed on the outer peripheral surface of the photoconductor drum 21 onto one of the recording media 9A. The transfer unit 25 includes a transfer member that has, for example, a roll-like shape, and the transfer member is brought into contact with the outer peripheral surface of the photoconductor drum 21 and is supplied with a transfer current. The cleaning unit 26 is a unit that cleans the outer peripheral surface of the photoconductor drum 21 by removing unwanted substances such as undesirable toner and paper dust deposited on the outer peripheral surface of the photoconductor drum 21.

In the image forming device 2, a portion where the photoconductor drum 21 and the transfer unit 25 face each other corresponds to a transfer position TP at which transfer of a toner image is performed.

The medium supply device 4 is a device that accommodates and sends out the recording media 9A each of which is to be supplied to the transfer position TP in the image forming device 2. The medium supply device 4 includes units such as one or more accommodating units 41 in which the recording media 9A are accommodated and one or more delivery units 43 that send out the recording media 9A one by one.

The recording media 9A may be sheet-shaped recording media that are capable of being transported by the medium transport device 45 in the housing 10 and onto which toner images are transferable and thermally fixable, and the material, the form, and so forth of the recording media 9A are not particularly limited. In the image forming apparatus 1A, a recording medium such as a normal sheet, a coated sheet, a film, a piece of foil, a piece of sheet-shaped cloth that is cut to have a predetermined size or a recording medium such as an envelope is used as each of the recording media 9A.

The medium transport device 45 is a device that is an example of a transport unit configured to transport the heating target 9 such as one of the recording media 9A, and in the image forming apparatus 1A, the medium transport device 45 is configured as a device that transports each of the recording media 9A to a predetermined position in the housing 10.

The medium transport device 45 is disposed in the housing 10 in such a manner that a supply path along which the recording media 9A are transported from the medium supply device 4 to the transfer position TP in the image forming device 2, a relay path along which the recording media 9A are transported from the transfer position TP in the image forming device 2 to the fixing device 5A, an ejection path along which the recording media 9A are transported from the fixing device 5A to an ejection port 12, which is formed in, for example, a side surface portion of the housing 10, and so forth are formed. More specifically, the medium transport device 45 is formed by arranging a required number of pairs of transport rollers 46 (46*a* to 46*d*) and a required number of guide path members 47 at predetermined positions. The pairs of transport rollers 46 are each configured to transport each of the recording media 9A by nipping the recording medium 9A therebetween, and the guide path members 47 form a transport space or the like that guides the recording media 9A destination.

The fixing device 5A, which is an example of the heating device 5, is a device that performs heat and pressure treatments in order to fix a toner image, which is an unfixed image that has been transferred to one of the recording media 9A at the transfer position TP in the image forming device 2, onto the recording medium 9A. The fixing device 5A is formed by arranging units such as a heat rotating body 51 and a pressure rotating body 61 in an internal space of a housing 50 that has an introduction port 50*a* and an ejection port 50*b* for the recording media 9A.

In addition, in the fixing device 5A, as illustrated in FIG. 1 and FIG. 2, the heat rotating body 51 and the pressure rotating body 61 are arranged so as to rotate while being in contact with each other. The portion in which the heat rotating body 51 and the pressure rotating body 61 are in contact with each other is configured as a fixing treatment portion FN in which heat and pressure are applied to one of the recording media 9A and a toner image that pass through the fixing treatment portion FN.

Details of the fixing device 5A will be described later.

In the image forming apparatus 1A, for example, image formation is performed in the following manner.

In the image forming apparatus 1A, in response to a control unit (not illustrated) receiving a command for an image forming operation, in the image forming device 2, a charging operation, an exposure operation, a developing operation, and a transfer operation are performed. Meanwhile, the medium supply device 4 sends out a desired one of the recording media 9A, and the recording medium 9A is transported along the supply path of the medium transport device 45 and fed to the transfer position TP.

As a result, a toner image is formed on the photoconductor drum 21 in accordance with image information, and the toner image is transferred onto the recording medium 9A fed to the transfer position TP from the medium supply device 4 by the medium transport device 45. In this case, the recording medium 9A to which the toner image has been transferred is separated from the photoconductor drum 21, which is rotating, while being nipped between the photoconductor drum 21 and the transfer unit 25 and then transported toward the heating device 5 along the relay path of the medium transport device 45.

Subsequently, in the fixing device 5A of the image forming apparatus 1A, when one of the recording media 9A to which toner images 92 have been transferred is introduced into the fixing treatment portion FN, in which the heat rotating body 51 and the pressure rotating body 61 are in contact with each other, so as to pass through the fixing treatment portion FN as illustrated in FIG. 2, a fixing operation is performed. As a result, in the fixing device 5A, the unfixed toner images 92 on the recording medium 9A are heated under pressure, and the toner images 92 melt and are fixed onto the recording medium 9A.

The recording medium 9A to which the toner images 92 have been fixed is ejected from the housing 50 while being nipped between the heat rotating body 51 and the pressure rotating body 61 in the fixing device 5A and then transported along the ejection path of the medium transport device 45 to the ejection port 12. Finally, the recording medium 9A is sent out by the transport rollers 46*d* and accommodated in an ejected-sheet-accommodating unit (not illustrated) that is formed in a portion of the housing 10.

By performing the above series of operations, a basic image forming operation for forming a monochromatic image onto a surface of one of the recording media 9A is completed.

<Heating Device>

Figure 3:
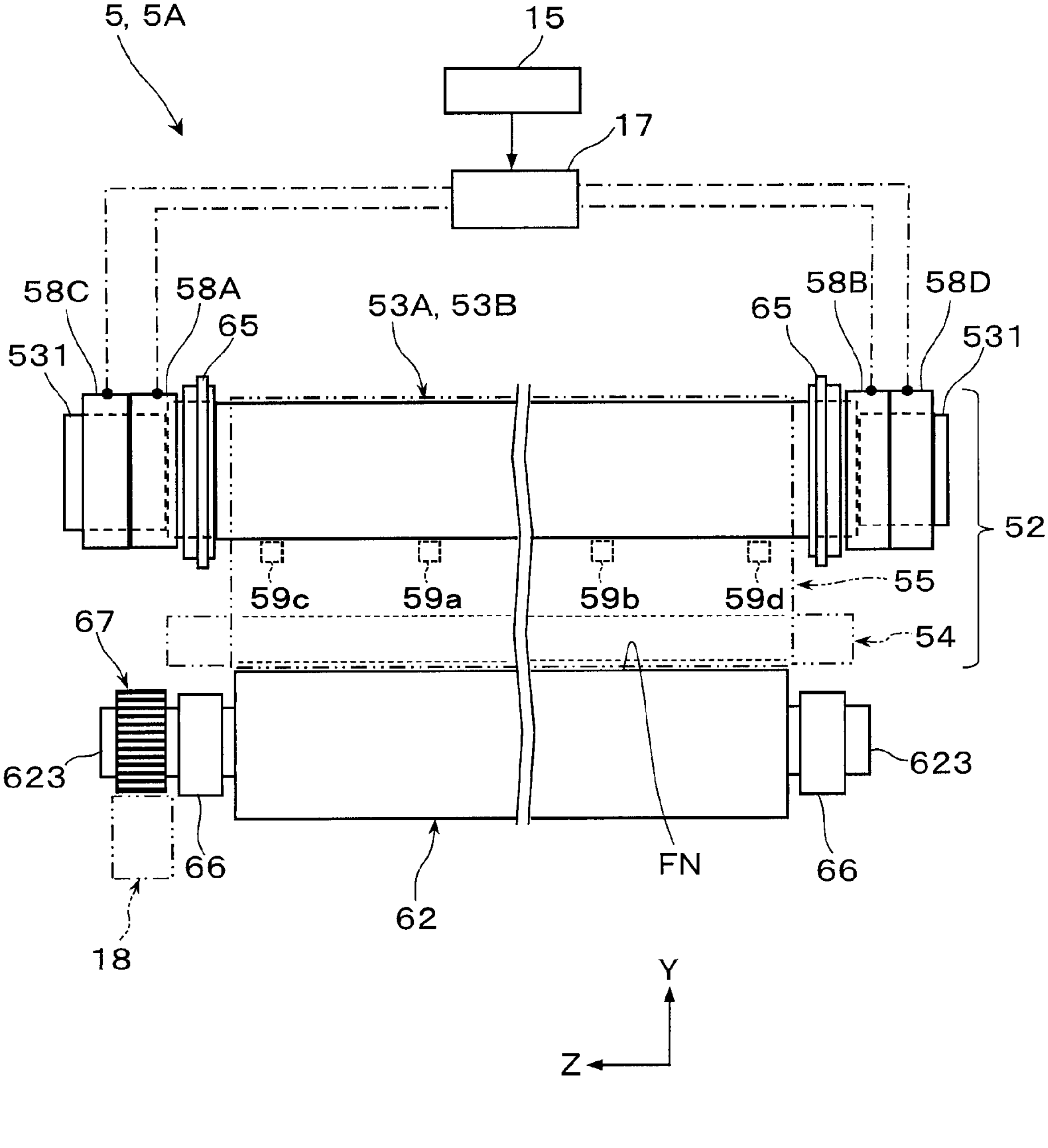
FIG. 3 is a schematic diagram illustrating a portion of the fixing device illustrated in FIG. 2.

The fixing device 5A will now be described in detail. As illustrated in FIG. 2, FIG. 3, and the like, the fixing device 5A according to the first exemplary embodiment uses a belt-nip-type heating unit 52 as the above-mentioned heat rotating body 51 and a pressure roller 62 having a roll-like shape as the above-mentioned pressure rotating body 61.

The heating unit 52 includes a heating roller 53A, a support member 54, a fixing belt 55, an adjustment support roller 56, and so forth that are integrated with one another.

Figure 4A:
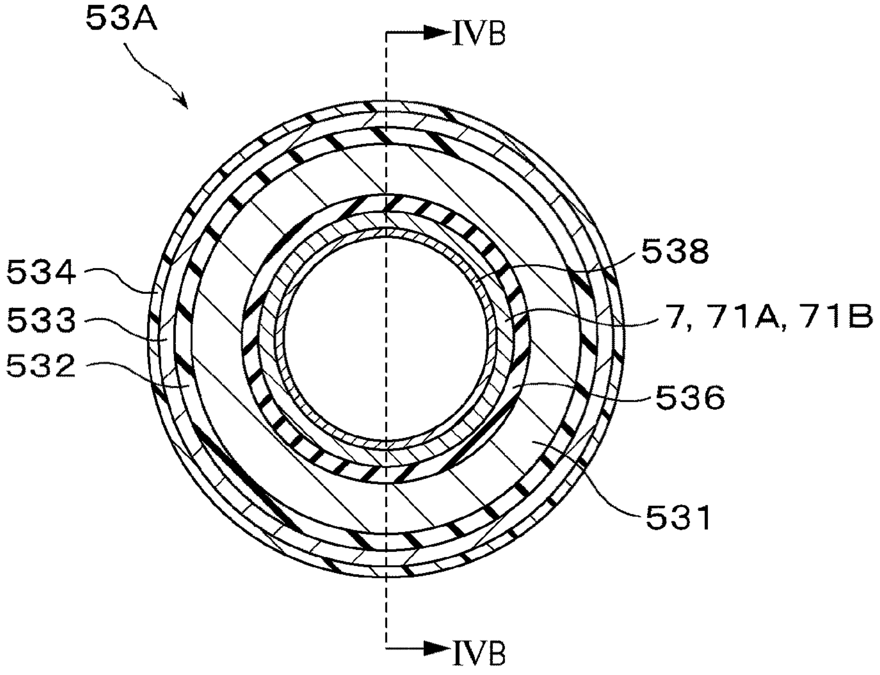
FIG. 4A and FIG. 4B are respectively a schematic cross-sectional view of a heating roller and a schematic cross-sectional view taken along line IVB-IVB of FIG. 4A.
Figure 4B:
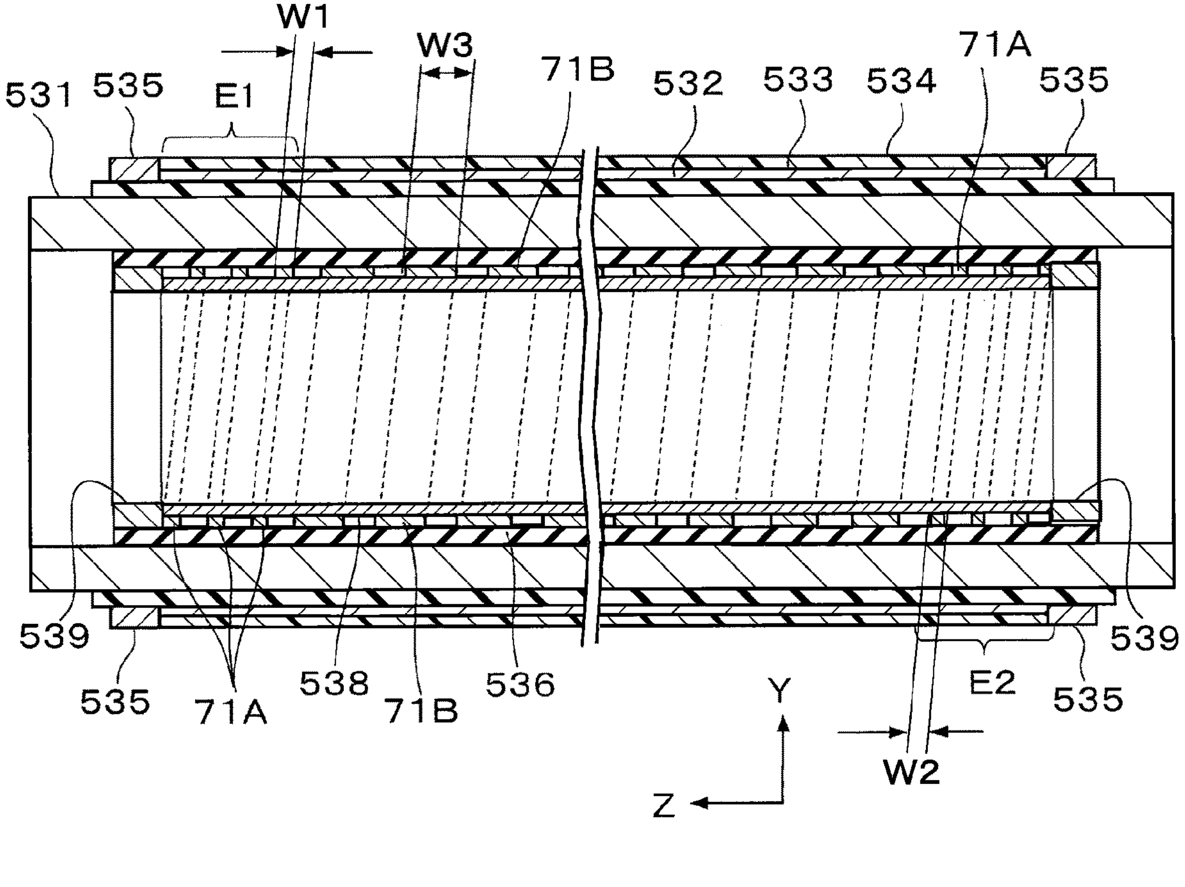

As illustrated in FIGS. 4A and 4B, the heating roller 53A is a roller body having a multilayer structure in which an electrical insulating layer 532, a first resistance heat-generating layer 533 that generates heat by passage of a current therethrough, and an outer surface layer 534 are provided in this order on the outer peripheral surface of a cylindrical roller base member 531, and in which an electrical insulating layer 536, an inner auxiliary resistance heat-generating layer 71, which is an example of an auxiliary heating unit 7 that supplementarily heats regions E1 and E2 included in a heat-generating region in which heat is generated by the first resistance heat-generating layer 533, the regions E1 and E2 being located at the two ends of the heat-generating region in the axial direction, and an inner surface layer 538 are formed in this order on the inner peripheral surface of the cylindrical roller base member 531.

The roller base member 531 is a cylindrical body that is made of a metal material such as aluminum or iron and that has a thickness of about 0.2 mm to about 1.0 mm. The electrical insulating layer 532 is an insulating film made of a material such as a polyimide or polyether ether ketone (PEEK) that has an insulating property.

The first resistance heat-generating layer 533 is a layer that generates heat by passage of a current therethrough and is a layer that is formed in a solid manner on the outer peripheral surface of (the roller base member 531 of) the heating roller 53A in such a manner as to have a desired layer thickness in order to heat the entire region to be heated of the heating roller 53A. The first resistance heat-generating layer 533 is a layer or a film made of a material such as silver palladium, gold palladium, or a mixture of carbon and a metal filler. Although the first resistance heat-generating layer 533 is formed by, for example, a die-casting application technique from the standpoint of making the first resistance heat-generating layer 533 to have a uniform layer thickness or the like, the first resistance heat-generating layer 533 may be formed by, for example, screen printing. In addition, power is supplied to the first resistance heat-generating layer 533 via electrode layers 535 formed at the two ends of the heating roller 53A in the axial direction of the heating roller 53A.

The outer surface layer 534 is a layer that has favorable thermal conductivity and a favorable electrical insulating property and that is capable of protecting the first resistance heat-generating layer 533. The outer surface layer 534 may be a layer having tackiness for transmitting a rotational power to the fixing belt 55 and wettability with respect to a lubricating material, which will be described later, and from this standpoint, the outer surface layer 534 is made of a material having low releasability (e.g., a polyimide, polyether ether ketone (PEEK), or the like).

The inner auxiliary resistance heat-generating layer 71 is a layer that generates heat by passage of a current therethrough and is a layer that is partially provided on the inner peripheral surface of (the roller base member 531 of) the heating roller 53A in order to supplementarily heat, from a space enclosed by the heating roller 53A, the regions E1 and E2 at the left and right ends of the region to be heated of the heating roller 53A. The inner auxiliary resistance heat-generating layer 71 is a layer or a film made of the same material as the first resistance heat-generating layer 533.

The inner auxiliary resistance heat-generating layer 71 is provided on the inner peripheral surface of the roller base member 531 in such a manner as to extend in a helical pattern in the axial direction. In addition, the inner auxiliary resistance heat-generating layer 71 is formed in a helical pattern such that helical pattern widths W1 and W2 of end helical portions 71A that are formed in the left and right end regions E1 and E2 are each smaller than a helical pattern width W3 of a central helical portion 71B that is formed in a central region excluding the left and right end regions E1 and E2.

As a result, in the inner auxiliary resistance heat-generating layer 71, the resistance of each of the end helical portions 71A formed in the left and right end regions E1 and E2 is relatively large, and thus, each of the end helical portions 71A is capable of generating more heat than the central helical portion 71B formed in the central region.

The inner auxiliary resistance heat-generating layer 71 is formed by, for example, the die-casting application technique. In addition, power is supplied to the inner auxiliary resistance heat-generating layer 71 via electrode layers 539 formed at the two ends of the heating roller 53A in the axial direction.

The inner surface layer 538 is, for example, a layer that has an electrical insulating property and that is capable of protecting the inner auxiliary resistance heat-generating layer 71.

As illustrated in FIG. 3, the two end portions of the roller base member 531 are attached to upper side surface portions of the housing 50 with bearings 65 interposed therebetween such that the heating roller 53A is rotatable.

In addition, in the heating roller 53A, power supply connectors 58A, 58B, 58C, and 58D are attached to shaft portions that are formed of the two end portions of the roller base member 531 projecting toward the outside of the bearings 65.

The power supply connectors 58A, 58B, 58C, and 58D include power supply rings (not illustrated) that are arranged inside cylindrical insulating covers. The power supply rings that correspond to the power supply connectors 58A and 58B are electrically connected to the electrode layers 535 for the first resistance heat-generating layer 533, which are formed on the outer peripheral surface of the two end portions of the heating roller 53A. The power supply rings that correspond to the power supply connectors 58C and 58D are electrically connected to the electrode layers 539 for the inner auxiliary resistance heat-generating layer 71, which are provided on the inner peripheral surface of the two end portions of the heating roller 53A.

The power supply connectors 58A, 58B, 58C, and 58D are connected to a power supply unit 17. When heating is required, a current required for the first resistance heat-generating layer 533 is supplied to the power supply connectors 58A and 58B from the power supply unit 17, and a current required for the inner auxiliary resistance heat-generating layer 71 is supplied to the power supply connectors 58C and 58D from the power supply unit 17.

The fixing belt 55 is heated by the heating roller 53A, and in the fixing treatment portion FN, the fixing belt 55 comes into contact with a surface of one of the recording media 9A to which the toner images 92 have been transferred and heats the surface. As the fixing belt 55, a flexible, heat-resistant endless belt for heat conduction is used, and an example of such a belt is a belt having a layered structure in which an elastic layer made of an elastic material, such as a silicone rubber, and a release layer made of a resin material, such as polytetrafluoroethylene (PTFE), are formed in this order on the outer peripheral surface of a cylindrical belt base member made of a synthetic resin, such as a polyimide or polyamide.

In addition, as illustrated in FIG. 2, the fixing belt 55 rotates in a direction indicated by arrow C while being stretched by the support member 54 and the adjustment support roller 56.

The support member 54 is a member that is disposed in such a manner as to be in contact with the inner peripheral surface of the fixing belt 55 and that supports and forms the fixing treatment portion FN in which the heating treatment is performed. The fixing treatment portion FN is a treatment portion for heating and fixing that is formed at a portion of the outer peripheral surface of the fixing belt 55, the portion being supported by the support member 54. The support member 54, which is in contact with the inner peripheral surface of the fixing belt 55, is a structure formed of a plate-shaped support that has a hollow structure and that is disposed in such a manner as to extend parallel to the axial direction of the heating roller 53A and a pad member that is attached to a surface portion of the support, the surface portion being in contact with the inner peripheral surface of the fixing belt 55.

In addition, the support member 54 is positioned by fixedly attaching two end portions of the support that protrude from the two ends of the fixing belt 55 to, for example, side surface portions of the housing 50.

The adjustment support roller 56 is a roller that holds the fixing belt 55, which in the stretched state, in a desired shape by exerting a required tension on the fixing belt 55 and performs adjustment for stabilizing the rotating state of the fixing belt 55.

As illustrated in FIG. 2, the heating unit 52 further includes a lubricating-material application unit 57 that applies the lubricating material to the inner peripheral surface of the fixing belt 55 and a temperature sensor 59, which is an example of a temperature measuring unit that measures the surface temperature of the heating roller 53A.

In addition, as illustrated in FIG. 3, in the heating unit 52, a plurality of temperature sensors 59*a* to 59*d* are arranged at predetermined positions (e.g., in the two end regions E1 and E2 and in the central region other than these end regions) in the axial direction of the heating roller 53A so as to measure surface temperatures of the heating roller 53A in a plurality of regions, and the heating unit 52 transmits the measurement results to a control device 15. The control device 15 controls the output operation or the like of the power supply device 17 so as to adjust the heating state.

In contrast, as illustrated in FIG. 2, the pressure roller 62 is a roller body having a structure in which an elastic release layer 622 is provided on the outer peripheral surface of a roller base member 621 that has a columnar shape or a cylindrical shape.

As illustrated in FIG. 2, the pressure roller 62 is attached to lower side surfaces of the housing 50 with bearings 66 interposed therebetween so as to be rotatable at a position where the pressure roller 62 faces the support member 54, the bearings 66 being attached to shaft portions 623 that protrude from the two ends of the roller base member 621.

In addition, the bearings 66 are attached to the pressure roller 62 in such a manner as to be displaceable in directions toward and away from the support member 54, and a predetermined pressure in a direction toward the support member 54 is applied to the bearings 66 by urging members (not illustrated) such as springs. As a result, the fixing belt 55 passes through (the pad member of) the support member 54 while being pressed against (the pad member of) the support member 54 with a predetermined pressure.

Furthermore, a power receiving component 67 such as a gear that receives a rotational power that is transmitted at the timing at which the fixing treatment or the like is performed is attached to one of shaft portions of the pressure roller 62. A rotational power from a driving device (not illustrated) that is disposed in the housing 10 of the image forming apparatus 1A is transmitted to the power receiving component 67 via a final transmission gear 18.

In the fixing device 5A, when it is time to perform the fixing treatment or the like, the first resistance heat-generating layer 533 of the heating roller 53A in the heating unit 52 generates heat by passage of a current therethrough and starts heating the heating roller 53A such that the heating roller 53A is kept at a predetermined temperature. In addition, in the fixing device 5A, as illustrated in FIG. 2, the pressure roller 62 is driven so as to rotate in a direction indicated by arrow B, and a rotational force of the pressure roller 62 is transmitted to the fixing belt 55, which is in contact with the pressure roller 62, in the fixing treatment portion FN, so that the fixing belt 55 is driven and starts rotating in the direction indicated by arrow C.

As a result, the fixing belt 55 rotates in such a manner as to pass through the fixing treatment portion FN while being heated to a predetermined temperature by the heating roller 53A, and the fixing device 5A becomes capable of performing the fixing treatment.

In addition, in the fixing device 5A, when the control device 15 determines, from detection information obtained by the plurality of temperature sensors 59*a* to 59*d*, that the surface temperature in each of the regions E1 and E2, which are located at the left and right ends of the region to be heated of the heating roller 53A in the axial direction, is lower than the surface temperature in the central region excluding the left and right end regions E1 and E2, power is supplied to the inner auxiliary resistance heat-generating layer 71 of the heating roller 53A from the power supply unit 17, and the inner auxiliary resistance heat-generating layer 71 generates heat.

In this case, the left and right end helical portions 71A of the inner auxiliary resistance heat-generating layer 71, which is formed in a helical pattern, each generate more heat than the central helical portion 71B and thus supplementarily heat the left and right end regions E1 and E2 of the heating roller 53A. Note that, in this case, the central helical portion 71B of the inner auxiliary resistance heat-generating layer 71 also generates a reasonable amount of heat, and thus, the central region of the heating roller 53A is also supplementarily heated.

Thus, in the fixing device 5A, even when there is uneven distribution of temperature in the axial end regions E1 and E2 of the heating roller 53A, which has the first resistance heat-generating layer 533, supplemental heating is achieved by the inner auxiliary resistance heat-generating layer 71 that supplementarily heats at least the two axial end regions E1 and E2 included in the region in which heat is generated by the first resistance heat-generating layer 533 of the heating roller 53A, and thus, the uneven distribution of temperature is suppressed, whereas in the case where the inner auxiliary resistance heat-generating layer 71 is not provided, the supplemental heating is not obtained, and the uneven distribution of temperature is not suppressed.

Note that, in the fixing device 5A, for example, when the fixing device 5A is started up for the first time or when the fixing device 5A is restarted after it has been in a nonoperating state for a long period of time, power is supplied to the inner auxiliary resistance heat-generating layer 71 at first so as to cause the inner auxiliary resistance heat-generating layer 71 to generate heat.

Modification of First Exemplary Embodiment

In the fixing device 5A, a heating roller 53B that has the following configuration example may be used instead of the heating roller 53A.

Figure 5:
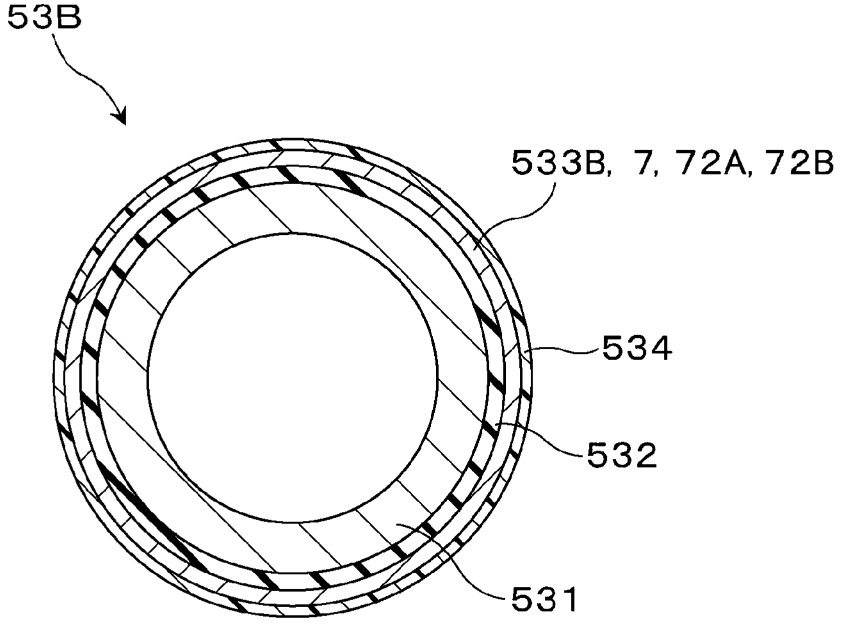
FIG. 5 is a schematic cross-sectional view of a heating roller that is used in a modification of the first exemplary embodiment.
Figure 6:
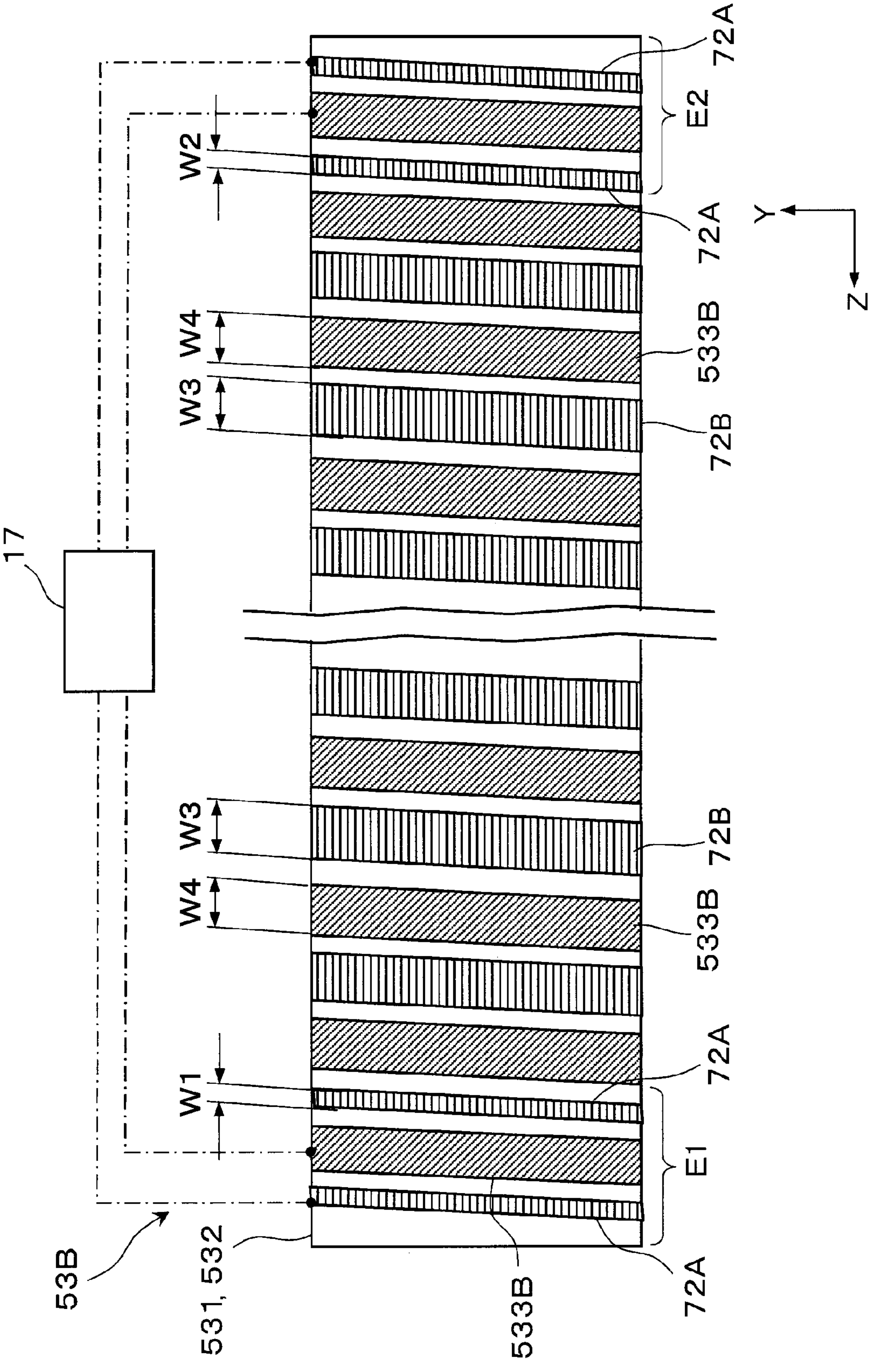
FIG. 6 is a schematic diagram of the heating roller illustrated in FIG. 2.

The heating roller 53B illustrated in FIG. 5 and FIG. 6 is different from the heating roller 53A in that nothing is provided on the inner peripheral surface of the roller base member 531 and in that a second resistance heat-generating layer 533B formed in a helical pattern and an outer auxiliary resistance heat-generating layer 72 formed in a helical pattern are provided on the outer peripheral surface of the roller base member. The configuration of the heating roller 53B, excluding the above, is the same as that of the above-described heating roller 53A.

The second resistance heat-generating layer 533B is provided as a layer that is formed in a helical pattern extending in the axial direction and that has the same pattern width W4. The second resistance heat-generating layer 533B is the same as the first resistance heat-generating layer 533, except with regard to the pattern in which the second resistance heat-generating layer 533B is formed. In addition, the second resistance heat-generating layer 533B is formed by, for example, screen printing.

The outer auxiliary resistance heat-generating layer 72 is provided as a layer that is formed in a helical pattern extending parallel to the axial direction in spaces between portions of the second resistance heat-generating layer 533B formed in the helical pattern. In addition, similar to the inner auxiliary resistance heat-generating layer 71, the outer auxiliary resistance heat-generating layer 72 is formed such that the helical pattern widths W1 and W2 of end helical portions 72A that are formed in the left and right end regions E1 and E2 are each smaller than a helical pattern width W3 of a central helical portion 72B that is formed in a central region excluding the left and right end regions E1 and E2. Furthermore, similar to the outer auxiliary resistance heat-generating layer 72, the outer auxiliary resistance heat-generating layer 72 is formed by, for example, screen printing.

The second resistance heat-generating layer 533B and the outer auxiliary resistance heat-generating layer 72 each generate heat as a result of power being supplied thereto through electrodes (not illustrated) formed at the left and right ends of a region to be heated of the heating roller 53B.

In the fixing device 5A using the heating roller 53B, when power is supplied from the power supply unit 17, the heating roller 53B is heated by heat generated by the second resistance heat-generating layer 533B and also by heat generated by the outer auxiliary resistance heat-generating layer 72.

In this case, since the left and right end helical portions 72A of the outer auxiliary resistance heat-generating layer 72, which is formed in a helical pattern, each generate more heat than the central helical portion 72B, and thus, the left and right end helical portions 72A supplementarily and strongly heat the left and right end regions E1 and E2 of the heating roller 53B.

Thus, also in the fixing device 5A, even when there is uneven distribution of temperature in the axial end regions E1 and E2 of the heating roller 53B, which has the second resistance heat-generating layer 533B, supplemental heating is achieved by the outer auxiliary resistance heat-generating layer 72 that supplementarily heats at least the two axial end regions E1 and E2 included in the region in which heat is generated by the second resistance heat-generating layer 533B of the heating roller 53B, and thus, the uneven distribution of temperature is suppressed, whereas in the case where the outer auxiliary resistance heat-generating layer 72 is not provided, the supplemental heating is not obtained, and the uneven distribution of temperature is not suppressed.

Second Exemplary Embodiment

Figure 7:
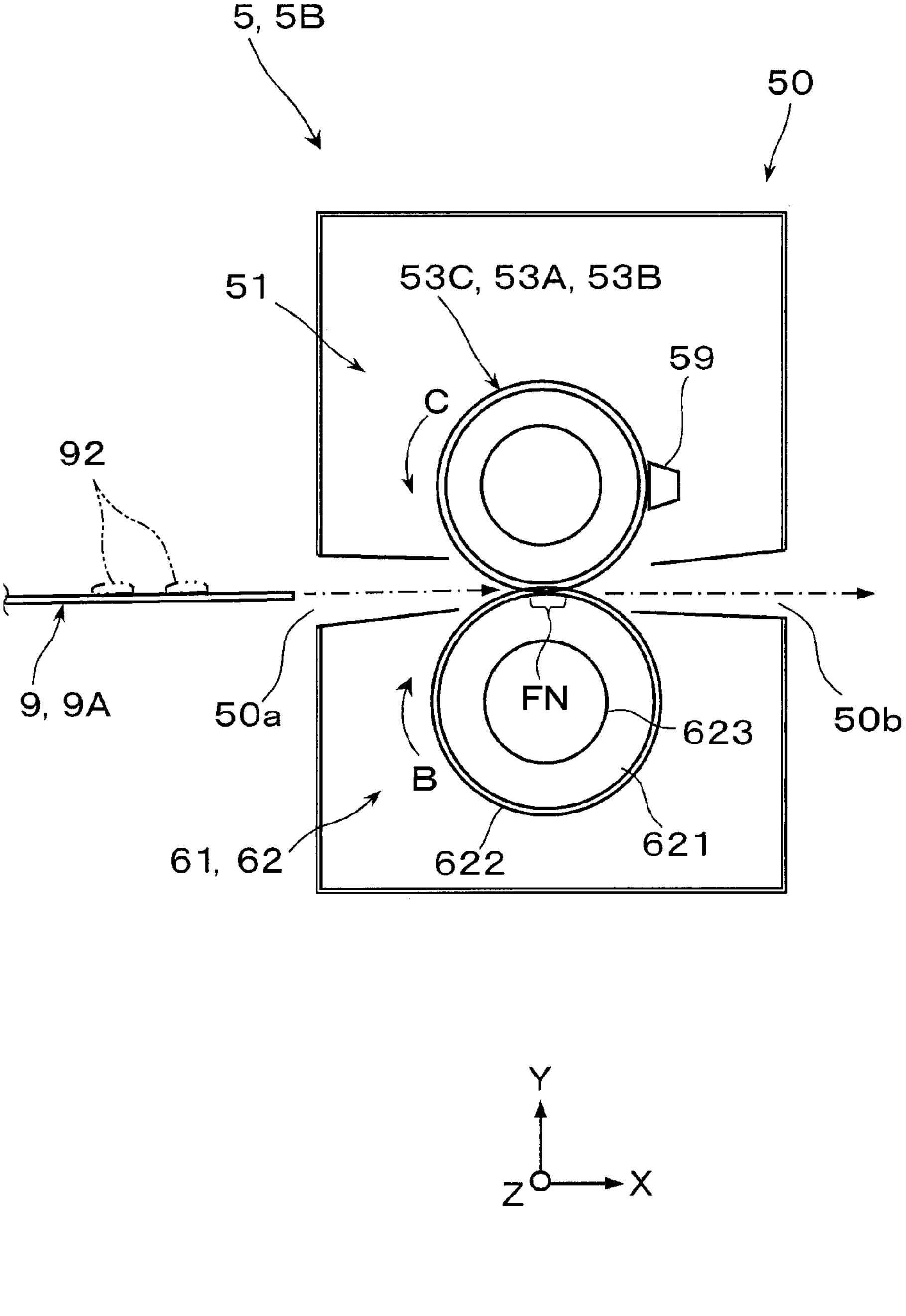
FIG. 7 is a schematic diagram of a fixing device according to a second exemplary embodiment, which is another example of the heating device.
Figure 8:
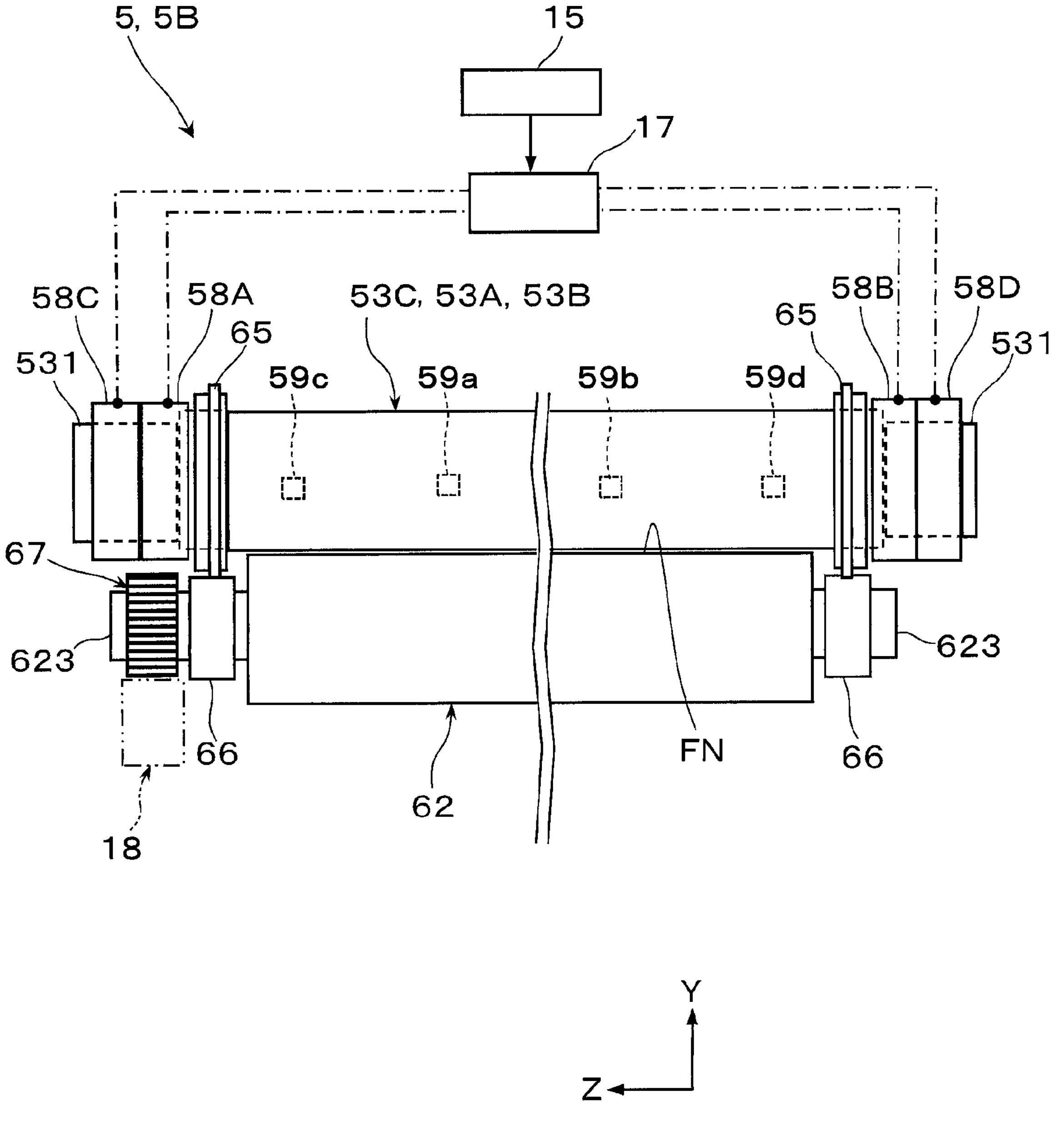
FIG. 8 is a schematic diagram illustrating a portion of the fixing device illustrated in FIG. 7.

FIG. 7 and FIG. 8 illustrate a fixing device 5B according to the second exemplary embodiment, which is another example of the heating device 5.

The fixing device 5B according to the second exemplary embodiment is different from the fixing device 5A according to the first exemplary embodiment in that the heat rotating body 51 is changed to a heating roller 53C that has a roll-like shape. The configuration of the fixing device 5B excluding the above, is the same as that of the fixing device 5A. Accordingly, in the following description and the drawings, components that are common to the first exemplary embodiment are denoted by the same reference signs used in the first exemplary embodiment, and descriptions of the components will be omitted unless necessary.

The heating roller 53A or 53B, which has been described as an example in the first exemplary embodiment, may be used as the heating roller 53C in the fixing device 5B. In this case, however, it is necessary to suitably change the conditions such as the thickness of the roller base member 531. In addition, in the case of using the heating roller 53A or 53B, it is not necessary to provide an electrical insulation layer, an inner resistance heat-generating layer, and an inner surface layer on the inner peripheral surface of the roller. Furthermore, in the case of using the heating roller 53A or 53B, the outer surface layer 534 provided on the outer peripheral surface of the roller is a layer that has favorable thermal conductivity and a favorable electrical insulating property and that is capable of protecting the first resistance heat-generating layer 533 or the second resistance heat-generating layer 533B. The outer surface layer 534 is a layer that needs to have favorable releasability, and thus, the outer surface layer 534 is made of a material having favorable releasability (e.g., a fluorocarbon resin or the like).

Also in the fixing device 5B that uses the heating roller 53C having a roll-like shape, even when there is uneven distribution of temperature in the axial end regions E1 and E2 of the heating roller 53C (53A or 53B), which has the first resistance heat-generating layer 533 or the second resistance heat-generating layer 533B, supplemental heating is achieved by the inner auxiliary resistance heat-generating layer 71 or the outer auxiliary resistance heat-generating layer 72 that supplementarily heats at least the two axial end regions E1 and E2 included in the region in which heat is generated by the first resistance heat-generating layer 533 or the second resistance heat-generating layer 533B of the heating roller, and thus, the uneven distribution of temperature is suppressed, whereas in the case where the inner auxiliary resistance heat-generating layer 71 or the outer auxiliary resistance heat-generating layer 72 is not provided, the supplemental heating is not obtained, and the uneven distribution of temperature is not suppressed.

Third Exemplary Embodiment

Figure 9:
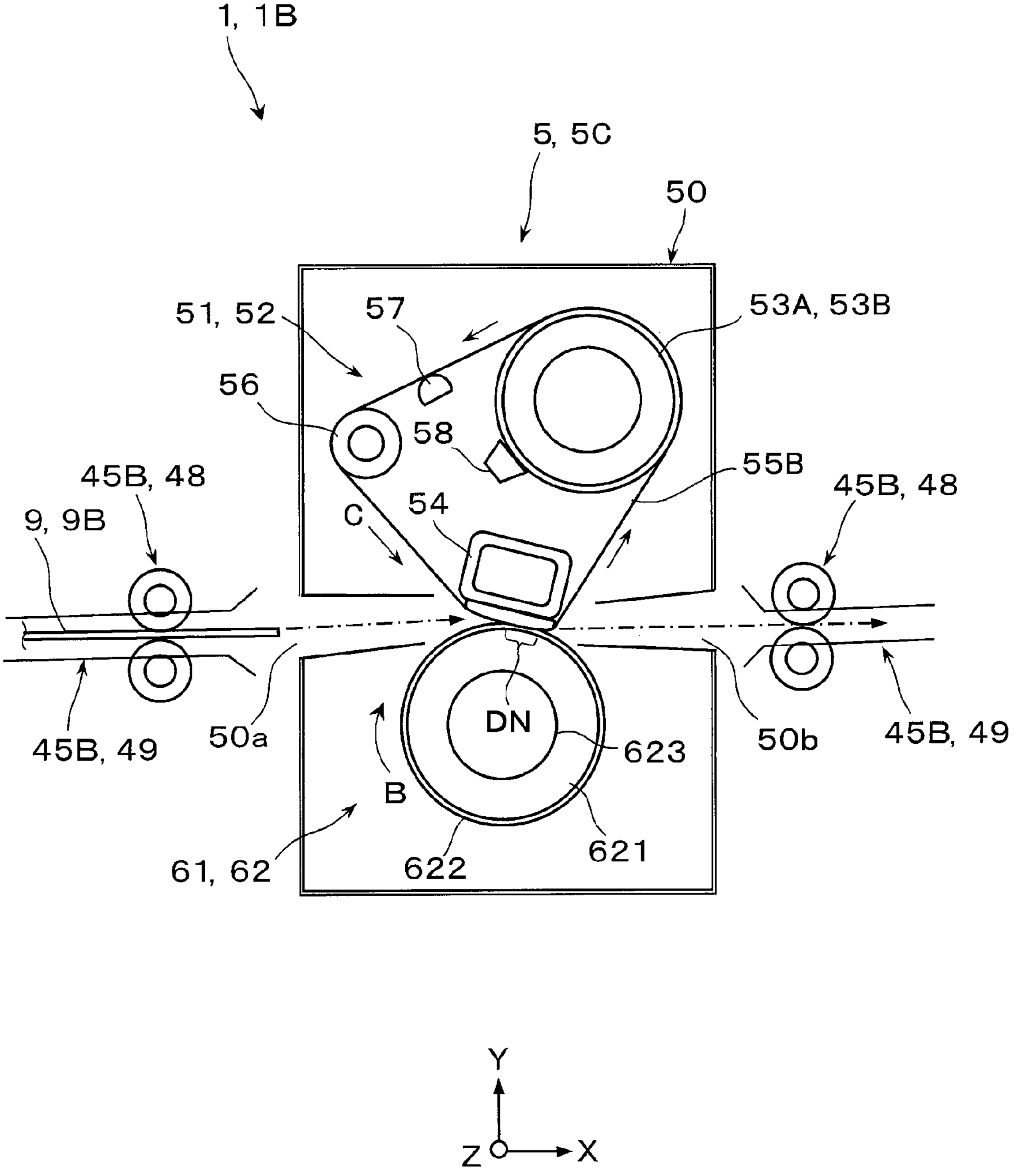
FIG. 9 is a schematic diagram illustrating a heating device according to a third exemplary embodiment and a heating-and-drying apparatus according to the third exemplary embodiment, which is another example of the heating-target using apparatus.

FIG. 9 illustrates a heating device 5C according to the third exemplary embodiment that is another example of the heating device 5 and a heating-and-drying apparatus 1B according to the third exemplary embodiment that uses the heating device 5C and that is another example of the apparatus 1 using and an object to be heated.

The heating device 5C according to the third exemplary embodiment is different from the fixing device 5A according to the first exemplary embodiment in that the fixing belt 55 is changed to a heating belt 55B. The configuration of the heating device 5C excluding the above, is the same as that of the heating device 5A. Accordingly, in the following description and the drawings, components that are common to the first exemplary embodiment are denoted by the same reference signs used in the first exemplary embodiment, and descriptions of the components will be omitted unless necessary.

In the heating device 5C, a belt having favorable thermal conductivity is used as the heating belt 55B, and for example, a belt that is formed of a cylindrical belt base member made of a synthetic resin such as a polyimide or polyamide is used. Note that, the above-mentioned fixing belt 55 may be used as the heating belt 55B.

In addition, in the heating device 5C, a portion in which a portion of the heating belt 55B that is supported by the support member 54 and the pressure roller 62 are pressed into contact with each other is configured as a drying treatment portion DN in which heating and drying treatments are performed.

The heating-and-drying apparatus 1B using the heating device 5C includes a sheet transport device 45B that transports a sheet-shaped object 9B that requires heating and drying as the heating target 9 in such a manner that the sheet-shaped object 9B is introduced into and passes through the drying treatment portion DN of the heating device 5C. The sheet transport device 45B includes pairs of transport rollers 48, guide members 49, and so forth. Examples of the sheet-shaped object 9B include the above-mentioned recording media 9A.

Also in the heating device 5C, even when there is uneven distribution of temperature in the axial end regions E1 and E2 of the heating roller 53A that has the first resistance heat-generating layer 533, supplemental heating is achieved by the inner auxiliary resistance heat-generating layer 71 that supplementarily heats at least the two axial end regions E1 and E2 included in the region in which heat is generated by the first resistance heat-generating layer 533 of the heating roller 53A, and thus, the uneven distribution of temperature is suppressed, whereas in the case where the inner auxiliary resistance heat-generating layer 71 is not provided, the supplemental heating is not obtained, and the uneven distribution of temperature is not suppressed.

Modifications

The present disclosure is not limited to the configuration examples that have been described as examples in the above exemplary embodiments, and for example, the present disclosure also includes modifications such as those described below.

As the auxiliary heating unit 7, end-portion heating devices such as halogen lamps that heat portions corresponding to the end regions E1 and E2 included in the region in which heat is generated by the first resistance heat-generating layer 533 of the heating roller 53A (the second resistance heat-generating layer 533B of the heating roller 53B) may be used other than the above-mentioned inner auxiliary resistance heat-generating layer 71 or the above-mentioned outer auxiliary resistance heat-generating layer 72.

Regarding the film thickness of the first resistance heat-generating layer 533 or the second resistance heat-generating layer 533B in the heating roller 53A, 53B, or 53C, the film thickness in each of the end regions E1 and E2 of the region in which heat is generated by the first resistance heat-generating layer 533 or the second resistance heat-generating layer 533B may be set to be larger than the film thickness in the other region (the central region excluding the end regions E1 and E2). In this case, in the heating roller 53A or the like, the film thickness in each of the end regions E1 and E2 of the heat-generating region is large, and thus, the amount of heat that is generated in each of the end regions E1 and E2 is reduced, which in turn results in a decrease in the temperature. However, the auxiliary heating unit 7 may compensate for insufficient heat generation and a decrease in the temperature in each of the end regions E1 and E2 by performing supplemental heating.

In the above-described fixing device 5A, the adjustment support roller 56 of the heating unit 52 does not need to be provided. In addition, in the fixing device 5A or 5B or in the heating device 5C, for example, a belt-nip-type pressure rotating body may be used as the pressure rotating body 61 instead of the pressure roller 62 having a roll-like shape.

In the first exemplary embodiment and the like, although a configuration example in which the image forming apparatus 1A forms a monochromatic image has been described, the image forming apparatus 1A may be an apparatus that forms a polychromatic image by combining toners of a plurality of colors, and the format and so forth are not particularly limited.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A heating device comprising:

a heating roller having a resistance heat-generating layer configured to generate heat by passage of a current through the resistance heat-generating layer;

a pressure rotating body configured to rotate in such a manner as to press a sheet-shaped heating target that is an object to be subjected to a heating treatment against an outer peripheral surface of the heating roller and in such a manner as to cause the heating target to pass through the outer peripheral surface of the heating roller; and an auxiliary heating unit configured to supplementarily heat at least an axial end region included in a heat-generating region in which heat is generated by the resistance heat-generating layer of the heating roller, wherein the auxiliary heating unit is an auxiliary resistance heat-generating layer that is partially provided on an inner peripheral surface of the heating roller on which the resistance heat-generating layer is not provided, and wherein the auxiliary resistance heat-generating layer is a layer that is formed in a helical pattern extending in an axial direction, and portions of the auxiliary resistance heat-generating layer that correspond to regions of two end portions of the heat-generating region each have a width smaller than a width of a portion of the auxiliary resistance heat-generating layer that corresponds to remaining regions of the heat-generating region excluding the two end portions.

2. The heating device according to claim 1, wherein the auxiliary heating unit is an end-portion heating device that heats a portion of the heating roller that corresponds to the end region of the heat-generating region.

3. The heating device according to claim 1, further comprising:

a temperature measuring unit that measures a surface temperature of the heating roller in the end region of the heat-generating region and a surface temperature of the heating roller in remaining regions of the heat-generating region excluding the end region, wherein a heating state of the auxiliary heating unit is adjusted based on measurement results obtained by the temperature measuring unit.

4. A heating-target using apparatus comprising:

a transport unit that transports a sheet-shaped heating target that is an object to be heated; and a heating device that heats the heating target transported by the transport unit, wherein the heating device is formed of the heating device according to claim 1.

5. The heating-target using apparatus according to claim 4, wherein the heating device is a fixing device that fixes an unfixed image onto a recording medium, which is the sheet-shaped heating target.

6. A heating device comprising:

a heating roller having a resistance heat-generating layer configured to generate heat by passage of a current through the resistance heat-generating layer;

a support member that supports a treatment portion in which a heating treatment is performed;

a belt that is stretched between at least the heating roller and the support member and that is configured to rotate;

a pressure rotating body configured to rotate in such a manner as to press a sheet-shaped heating target that is an object to be subjected to a heating treatment against the treatment portion including an outer peripheral surface portion of the belt that is supported by the support member and in such a manner as to cause the heating target to pass through the treatment portion; and an auxiliary heating unit configured to supplementarily heat at least an axial end region included in a heat-generating region in which heat is generated by the resistance heat-generating layer of the heating roller.

7. The heating device according to claim 6, wherein the auxiliary heating unit is an auxiliary resistance heat-generating layer that is partially provided on an outer peripheral surface of the heating roller on which the resistance heat-generating layer is provided.

8. The heating device according to claim 7, wherein the resistance heat-generating layer and the auxiliary resistance heat-generating layer are layers each of which is formed in a helical pattern and extend in an axial direction in such a manner as to be parallel to each other, and wherein a width of a portion of the auxiliary resistance heat-generating layer, the portion corresponding to the end region of the heat-generating region, is set to be smaller than a width of the resistance heat-generating layer.

9. The heating device according to claim 8, wherein a width of a portion of the auxiliary resistance heat-generating layer, the portion corresponding to remaining regions of the heat-generating region excluding the end region, is set to be larger than the width of the portion of the auxiliary resistance heat-generating layer corresponding to the end region.

10. The heating device according to claim 6, wherein the auxiliary heating unit is an auxiliary resistance heat-generating layer that is partially provided on an inner peripheral surface of the heating roller on which the resistance heat-generating layer is not provided.

11. The heating device according to claim 10, wherein the auxiliary resistance heat-generating layer is a layer that is formed in a helical pattern extending in an axial direction, and portions of the auxiliary resistance heat-generating layer that correspond to regions of two end portions of the heat-generating region each have a width smaller than a width of a portion of the auxiliary resistance heat-generating layer that corresponds to remaining regions of the heat-generating region excluding the two end portions.

12. The heating device according to claim 6, wherein the auxiliary heating unit is an end-portion heating device that heats a portion of the heating roller that corresponds to the end region of the heat-generating region.

13. The heating device according to claim 6, wherein a film thickness of the resistance heat-generating layer in the end region of the heat-generating region is set to be larger than a film thickness of the resistance heat-generating layer in remaining regions of the heat-generating region excluding the end region.

14. A heating device comprising:

a heating roller having a resistance heat-generating layer configured to generate heat by passage of a current through the resistance heat-generating layer;

a pressure rotating body configured to rotate in such a manner as to press a sheet-shaped heating target that is an object to be subjected to a heating treatment against an outer peripheral surface of the heating roller and in such a manner as to cause the heating target to pass through the outer peripheral surface of the heating roller; and an auxiliary heating unit configured to supplementarily heat at least an axial end region included in a heat-generating region in which heat is generated by the resistance heat-generating layer of the heating roller, wherein a film thickness of the resistance heat-generating layer in the end region of the heat-generating region is set to be larger than a film thickness of the resistance heat-generating layer in remaining regions of the heat-generating region excluding the end region.

15. The heating device according to claim 14, wherein the auxiliary heating unit is an auxiliary resistance heat-generating layer that is partially provided on the outer peripheral surface of the heating roller on which the resistance heat-generating layer is provided.

16. The heating device according to claim 15, wherein the resistance heat-generating layer and the auxiliary resistance heat-generating layer are layers each of which is formed in a helical pattern and extend in an axial direction in such a manner as to be parallel to each other, and wherein a width of a portion of the auxiliary resistance heat-generating layer, the portion corresponding to the end region of the heat-generating region, is set to be smaller than a width of the resistance heat-generating layer.

17. The heating device according to claim 16, wherein a width of a portion of the auxiliary resistance heat-generating layer, the portion corresponding to remaining regions of the heat-generating region excluding the end region, is set to be larger than the width of the portion of the auxiliary resistance heat-generating layer corresponding to the end region.

18. The heating device according to claim 15, wherein a film thickness of the resistance heat-generating layer in the end region of the heat-generating region is set to be larger than a film thickness of the resistance heat-generating layer in remaining regions of the heat-generating region excluding the end region.

* * * * *